United States Patent
Alcalay et al.

(10) Patent No.: US 11,790,796 B2
(45) Date of Patent: Oct. 17, 2023

(54) METHOD AND SYSTEM FOR DETERMINING A POSITION ERROR OF AN AIRCRAFT

(71) Applicant: Airbus Operations SAS, Toulouse (FR)

(72) Inventors: Guillaume Alcalay, Toulouse (FR); Thierry Bourret, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 188 days.

(21) Appl. No.: 17/345,433

(22) Filed: Jun. 11, 2021

(65) Prior Publication Data
US 2021/0398435 A1 Dec. 23, 2021

(30) Foreign Application Priority Data
Jun. 19, 2020 (FR) .................................. 2006445

(51) Int. Cl.
*G08G 5/02* (2006.01)
*B64D 45/04* (2006.01)
*G01C 21/20* (2006.01)

(52) U.S. Cl.
CPC .............. *G08G 5/025* (2013.01); *B64D 45/04* (2013.01); *G01C 21/20* (2013.01)

(58) Field of Classification Search
CPC ........ G08G 5/025; G08G 5/065; B64D 45/04; G01C 21/20; G01S 19/40
See application file for complete search history.

(56) References Cited

U.S. PATENT DOCUMENTS

| | | | | |
|---|---|---|---|---|
| 6,239,745 B1* | 5/2001 | Stratton | ................ | G01S 19/393 342/410 |
| 8,717,226 B2* | 5/2014 | Bon | ....................... | G01S 7/4026 342/75 |
| 9,561,868 B2* | 2/2017 | Bourret | ................... | B64C 13/18 |
| 2006/0161336 A1 | 7/2006 | Wischmeyer | | |
| 2008/0169941 A1 | 7/2008 | He | | |
| 2009/0048724 A1* | 2/2009 | Caule | .................... | B64C 25/426 701/16 |
| 2012/0215388 A1* | 8/2012 | Pepitone | ................ | G08G 5/025 701/14 |

(Continued)

FOREIGN PATENT DOCUMENTS

| | | |
|---|---|---|
| EP | 3346282 A1 | 7/2018 |
| FR | 3042047 A1 | 4/2017 |
| FR | 3052552 A1 | 12/2017 |

OTHER PUBLICATIONS

French Search Report; priority document.

*Primary Examiner* — Faris S Almatrahi
*Assistant Examiner* — Abdalla A Khaled
(74) *Attorney, Agent, or Firm* — Greer, Burns & Crain, Ltd.

(57) ABSTRACT

A method and system for determining a position error of an aircraft. The system comprises a set of collection modules implemented in an iterative manner, including an offset collection module, a position vector collection module, a set of sequentially implemented computation modules, including an angular alignment bias computation module, an observable position bias computation module and a position error computation module. The system thus allows a position error to be determined that is used to perform a landing in good conditions.

14 Claims, 4 Drawing Sheets

(56) References Cited

U.S. PATENT DOCUMENTS

| | | |
|---|---|---|
| 2014/0229039 A1* | 8/2014 | Murphy .................... G01S 3/28 |
| | | 701/17 |
| 2015/0032300 A1 | 1/2015 | Arethens et al. |
| 2015/0081143 A1* | 3/2015 | Snow ................... G08G 5/0021 |
| | | 701/16 |
| 2017/0356757 A1 | 12/2017 | Bourret et al. |
| 2018/0197422 A1* | 7/2018 | Arethens ................ G08G 5/025 |
| 2020/0258404 A1* | 8/2020 | Thompson ........... G05D 1/0676 |
| 2021/0026836 A1* | 1/2021 | Ganille ................... G01S 19/15 |
| 2021/0383703 A1* | 12/2021 | Venkataramana ..... G05D 1/042 |

* cited by examiner

METHOD AND SYSTEM FOR DETERMINING A POSITION ERROR OF AN AIRCRAFT

CROSS-REFERENCES TO RELATED APPLICATIONS

This application claims the benefit of the French patent application No. 2006445 filed on Jun. 19, 2020, the entire disclosures of which are incorporated herein by way of reference.

FIELD OF THE INVENTION

The present invention relates to a method and to a system for determining a position error of an aircraft implemented using a landing assistance device, in particular, during an approach phase with a view to landing on a runway.

BACKGROUND OF THE INVENTION

There are generally one or more predefined approaches for each runway of an airport that are published on aeronautical charts. Each approach has a corresponding reference approach path, which is particularly characterized by an approach axis of the considered runway. This approach axis can be defined by a lateral component and by a vertical component. The lateral component is generally aligned with a longitudinal axis of the runway. The vertical component of the approach axis generally forms an angle of 3° with the runway.

During an approach phase towards a runway of an airport, along a predefined approach for the runway, an aircraft can be guided to land on the runway by a radio navigation system. This radio navigation system can correspond to an "Instrument Landing System" (ILS). The ILS system comprises at least one ground-based transmitting station that is configured to transmit guidance signals allowing the aircraft to approach the approach axis corresponding to the predefined approach. A lateral guidance signal particularly exists among these signals that allows the aircraft to know the lateral offset that it has with the reference approach path (offset with the lateral component of the approach axis). This lateral guidance signal is generally denoted "Localizer signal". A vertical guidance signal also exists that allows the aircraft to know the vertical offset that it has with the reference approach path (offset with the vertical component of the approach axis). This vertical guidance signal is generally called "Glide signal" or "Glide Slope signal".

The stations transmitting these signals are regularly inspected by local authorities. The purpose of these inspections is to ensure that the precision of the signals transmitted by the ground-based transmitting stations to the ILS system complies with the standards of the "International Civil Aviation Organization" (ICAO).

However, these stations transmitting ILS signals are installed in the vicinity of the runways, taking into account the installation constraints that are specific to each airport. Thus, a transmitting station often cannot be installed in line with the longitudinal axis of the runway. The transmitting station is then laterally offset relative to the longitudinal axis of the runway. This means that the guidance axis of the aircraft defined by the Glide and Localizer guidance signals is not perfectly aligned with the approach axis corresponding to the predefined approach (generally aligned with the longitudinal axis of the runway and having a 3-degree slope for the vertical guidance). Therefore, an angular alignment bias exists for the guidance axis in relation to the approach axis.

Furthermore, the current position of the aircraft is generally determined by a position measurement module based on signals transmitted by a geopositioning system. The geopositioning system can correspond to a geolocation and navigation system using a GNSS ("Global Navigation Satellite System"), such as a GPS ("Global Positioning System").

However, the lateral position and/or the vertical position determined by the position and measurement module can be erroneous. Therefore, it is preferable for this error to be known, in particular in order to be able to proceed to the approach phase of the aircraft in good conditions.

SUMMARY OF THE INVENTION

The aim of the present invention is to overcome these disadvantages by proposing a system and a method for determining a position error of an aircraft.

To this end, the invention relates to a method for determining a position error of an aircraft during an approach procedure of the aircraft with a view to landing on a runway.

According to the invention, the method comprises at least the following steps implemented in an iterative manner:

a first set of collection steps implemented in each iteration, the first set of steps comprising:

an offset collection step, implemented by an offset collection module, involving collecting a current offset measured by an offset measurement module based on a reference guidance signal transmitted by a transmitting station of a landing assistance device, the landing assistance device comprising at least the ground-based transmitting station configured to transmit the reference guidance signal defining a reference guidance axis, the runway having a longitudinal axis and a threshold;

a position vector collection step, implemented by a position vector collection module, involving collecting a current position vector of the aircraft measured by a position vector measurement module based on signals transmitted by a geopositioning system, the current position vector comprising at least one current longitudinal position and at least one from among a current lateral position and a current vertical position;

a second set of computation steps comprising:

a first computation step, implemented by a first computation module in a first iteration, involving computing an angular alignment bias of the reference guidance axis in relation to the approach axis of the runway based on the current offset, the current longitudinal position and the at least one from among the current lateral position and the current vertical position;

a second computation step, implemented by a second computation module in a second iteration subsequent to the first iteration, involving computing an observable position bias based on the angular alignment bias computed in the first iteration, the current offset, the current longitudinal position and the at least one from among the current lateral position and the current vertical position;

a third computation step, implemented by a third computation module in a third iteration subsequent to the second iteration, involving computing the position error based on the observable position bias computed in the second iteration, the current longitudinal position and the longitudinal position measured in the first iteration;

a first transmission step, implemented by a first transmission module, involving transmitting the position error to a first user device.

Thus, by virtue of the method, it is possible to determine a position error measured by a GPS-type measurement module, in particular during an approach phase with a view to landing on a runway. By virtue of the method, this position error is precisely computed, even if there is an angular alignment bias in the reference guidance axis in relation to the approach axis of the runway.

According to one feature, the method further comprises a filtering step, implemented by a filtering module, involving filtering at least one of the following two biases:
  the angular alignment bias computed in the first computation step; and
  the observable position bias computed in the second computation step.

According to another feature, the method further comprises:
  a fourth computation step, implemented by a fourth computation module, involving computing a corrected angular alignment bias based on the current offset, the current longitudinal position, the at least one from among the current lateral position and the current vertical position and the position error computed in the third computation step;
  a second transmission step, implemented by a second transmission module, involving transmitting the corrected angular alignment bias to a second user device.

Furthermore, when the at least one from among the current lateral position and the current vertical position corresponds to the current lateral position, the angular alignment bias is computed in the first computation step using the following relation:

$$b_{LOC_{align}} = \arcsin\left(\frac{b_{LOC_{offset}} - \frac{\eta_{LOC_{\mu A}} \times 0.7(L-x_{RWY})}{L} y_{RWY}}{L - x_{RWY}}\right),$$

wherein:

$b_{LOC_{offset}}$ corresponds to the lateral position of the transmitting station in relation to the longitudinal axis of the runway;

$\eta_{LOC_{\mu A}}$ corresponds to the current lateral offset measured in microamperes by the offset measurement module;

$x_{RWY}$ corresponds to the current longitudinal position collected by the position vector collection module;

$y_{RWY}$ corresponds to the current lateral position collected by the position vector collection module;

L corresponds to the longitudinal position of the transmitting station in relation to the threshold of the runway.

Moreover, when the at least one from among the current lateral position and the current vertical position corresponds to the current lateral position, the observable lateral position bias is computed in the second computation step using the following relation:

$$b_{y_{obs}} = y_{RWY} - b_{LOC_{offset}} - (L-x_{RWY})\sin(b_{LOC_{align}}) - \frac{\eta_{LOC_{\mu A}} \times 0.7 \times (L-x_{RWY})}{L},$$

wherein:

$\eta_{GS_{rad}}$ corresponds to the current lateral offset measured in radians by the offset measurement module;

$b_{LOC_{offset}}$ corresponds to the lateral position of the transmitting station in relation to the longitudinal axis of the runway;

$b_{LOC_{align}}$ corresponds to the angular alignment bias computed in the first computation step;

$x_{RWY}$ corresponds to the current longitudinal position collected by the position vector collection module;

$y_{RWY}$ corresponds to the current lateral position collected by the position vector collection module;

L corresponds to the longitudinal position of the transmitting station in relation to the threshold of the runway.

In addition, when the at least one from among the current lateral position and the current vertical position corresponds to the current lateral position, the lateral position error is computed in the third computation step in one of the following two manners:
  by computing a temporal gradient of the observable lateral position bias, then extrapolating the value of the bias at the transmitting beacon as a function of the temporal gradient; or
  using a spatial extrapolation, in particular defined by the following relation:

$$b_y = b_{y_{obs}} \frac{L + x_{b_{LOC_{align}}}}{x_{RWY} - x_{b_{LOC_{align}}}},$$

wherein:

$$x_{b_{LOC_{align}}}$$

corresponds to the longitudinal position measured by the position vector module during the first iteration;

$b_{y_{obs}}$ corresponds to the observable lateral position bias computed in the second step;

$x_{RWY}$ corresponds to the current longitudinal position collected by the position vector collection module;

L corresponds to the longitudinal position of the transmitting station in relation to the threshold of the runway.

Moreover, when the at least one from among the current lateral position and the current vertical position corresponds to the current lateral position, the corrected angular alignment bias is computed in the fourth computation step using the following relation:

$$b_{LOC_{align_{TRUE}}} = \arcsin\left(\frac{b_{LOC_{offset}} - \frac{\eta_{LOC_{\mu A}} \times 0.7(L-x_{RWY})}{L} - y_{RWY} + b_y}{L - x_{RWY}}\right).$$

Furthermore, when the at least one from among the current lateral position and the current vertical position corresponds to the current vertical position, the angular alignment bias is computed in the first computation step using the following relation:

$$b_{GPA} = \frac{GPA - \text{sign}(\eta_{GS_{ddm}})\frac{0.12 \times GPA \times \eta_{GC_{ddm}}}{0.0875} - \arctan\left(\frac{z_{RWY}}{x_{RWY} + \frac{TCH}{\tan GPA}}\right)}{1 + \frac{0.12 \times \text{sign}(\eta_{GS_{ddm}}) \times \eta_{GS_{ddm}}}{0.0875}},$$

wherein:

GPA corresponds to an angle of the approach axis with the longitudinal axis of the runway;

$\eta_{GS_{ddm}}$ corresponds to the current vertical offset measured as DDM by the offset measurement module;

$x_{RWY}$ corresponds to the current longitudinal position collected by the position vector collection module;

$z_{RWY}$ corresponds to the current vertical position collected by the position vector collection module;

TCH corresponds to a height at which the vertical offset is zero at a position in line with the threshold of the runway.

Moreover, when the at least one from among the current lateral position and the current vertical position corresponds to the current vertical position, the observable vertical position bias is computed in the second computation step using the following relation:

$$b_{z_{obs}} = z_{RWY} - \left(x_{RWY} + \frac{TCH}{\tan(GPA)}\right)\tan(GPA - b_{GPA} - \eta_{GS_{rad}}),$$

wherein:

$\eta_{GS_{rad}}$ corresponds to the current vertical offset measured in radians by the offset measurement module;

$b_{GPA}$ corresponds to the angular alignment bias computed in the first computation step;

$x_{RWY}$ corresponds to the current longitudinal position collected by the position vector collection module;

$z_{RWY}$ corresponds to the current vertical position collected by the position vector collection module.

In addition, when the at least one from among the current lateral position and the current vertical position corresponds to the current vertical position, the vertical position error is computed in the third computation step in one of the following two manners:

- by computing a temporal gradient of the observable vertical position bias, then extrapolating the value of the bias at the transmitting beacon as a function of the temporal gradient; or
- using a spatial extrapolation, in particular defined by the following relation:

$$b_z = b_{z_{obs}} \frac{L_{GS} + x_{b_{GPA}}}{x_{RWY} - x_{b_{GPA}}},$$

wherein:

$x_{b_{GPA}}$ corresponds to the longitudinal position measured by the position vector module during the first iteration;

$b_{GPA}$ corresponds to the angular alignment bias computed in the first computation step;

$x_{RWY}$ corresponds to the current longitudinal position measured by the position vector measurement module;

$L_{GS}$ corresponds to a longitudinal distance between the transmitting station and the threshold of the runway.

For example, the longitudinal distance between the transmitting station and the threshold of the runway is computed based on the following relation:

$$L_{GS} = \frac{TCH}{\tan(GPA - \hat{b}_{GPA})},$$

wherein $\hat{b}_{GPA}$ corresponds to an estimated angular alignment bias.

In addition, when the at least one from among the current lateral position and the current vertical position corresponds to the current vertical position, the corrected angular alignment bias is computed in the fourth step using the following relation:

$$b_{GPA_{TRUE}} = \frac{GPA - \text{sign}(\eta_{GS_{ddm}})\frac{0.12 \times GPA \times \eta_{GC_{ddm}}}{0.0875} - \arctan\left(\frac{z_{RWY} - b_z}{x_{RWY} + \frac{TCH}{\tan GPA}}\right)}{1 + \frac{0.12 \times \text{sign}(\eta_{GS_{ddm}}) \times \eta_{GS_{ddm}}}{0.0875}}.$$

wherein:

GPA corresponds to an angle of the approach axis with the longitudinal axis of the runway (RWY);

$\eta_{GS_{ddm}}$ corresponds to the current vertical offset measured as DDM by the offset measurement module;

$x_{RWY}$ corresponds to the current longitudinal position measured by the position vector measurement module;

$z_{RWY}$ corresponds to the current vertical position measured by the position vector measurement module;

TCH corresponds to a height at which the vertical offset is zero at a position in line with the threshold of the runway.

The invention also relates to a system for determining a position error of an aircraft during an approach procedure of the aircraft with a view to landing on a runway.

According to the invention, the system comprises at least the following modules implemented in an iterative manner:

a first set of collection modules implemented in each iteration, the first set of modules comprising:

an offset collection module configured to collect a current offset measured by an offset measurement module based on a reference guidance signal transmitted by a transmitting station of a landing assistance device, the landing assistance device comprising at least the ground-based transmitting station configured to transmit the reference guidance signal defining a reference guidance axis, the runway having a longitudinal axis and a threshold;

a position vector collection module configured to collect a current position vector of the aircraft measured by a position vector measurement module based on signals transmitted by a geopositioning system, the current position vector comprising at least one current longitudinal position and at least one from among a current lateral position and a current vertical position;

a second set of computation modules comprising:

a first computation module, implemented in a first iteration, configured to compute an angular alignment bias of the reference guidance axis in relation to the approach axis of the runway based on the current offset, the current longitudinal position and the at least one from among the current lateral position and the current vertical position;

a second computation module, implemented in a second iteration subsequent to the first iteration, configured to compute an observable position bias based on the angular alignment bias computed in the first iteration, the current offset, the current longitudinal position and the at least one from among the current lateral position and the current vertical position;

a third computation module, implemented in a third iteration subsequent to the second iteration, configured to compute the position error based on the observable position bias computed in the second iteration, the current longitudinal position and the longitudinal position measured in the first iteration;

a first transmission module configured to transmit the position error to a first user device.

According to one feature, the system further comprises at least one of the following filtering modules:

a first filtering module configured to filter the angular alignment bias computed by the first computation module; and a second filtering module configured to filter the observable position bias computed by the second computation module.

According to another feature, the system further comprises:

a fourth computation module configured to compute a corrected angular alignment bias based on the current offset, the current longitudinal position, the at least one from among the current lateral position and the current vertical position and the position error computed by the third computation module;

a second transmission module configured to transmit the corrected angular alignment bias to a second user device.

The invention also relates to an aircraft, in particular a transport plane, comprising a system for determining a position error, such as that specified above.

BRIEF DESCRIPTION OF THE DRAWINGS

The invention, with its features and advantages, will become more clearly apparent from reading the description, which is provided with reference to the accompanying drawings, in which.

DETAILED DESCRIPTION OF THE PREFERRED EMBODIMENTS

Figure 1:
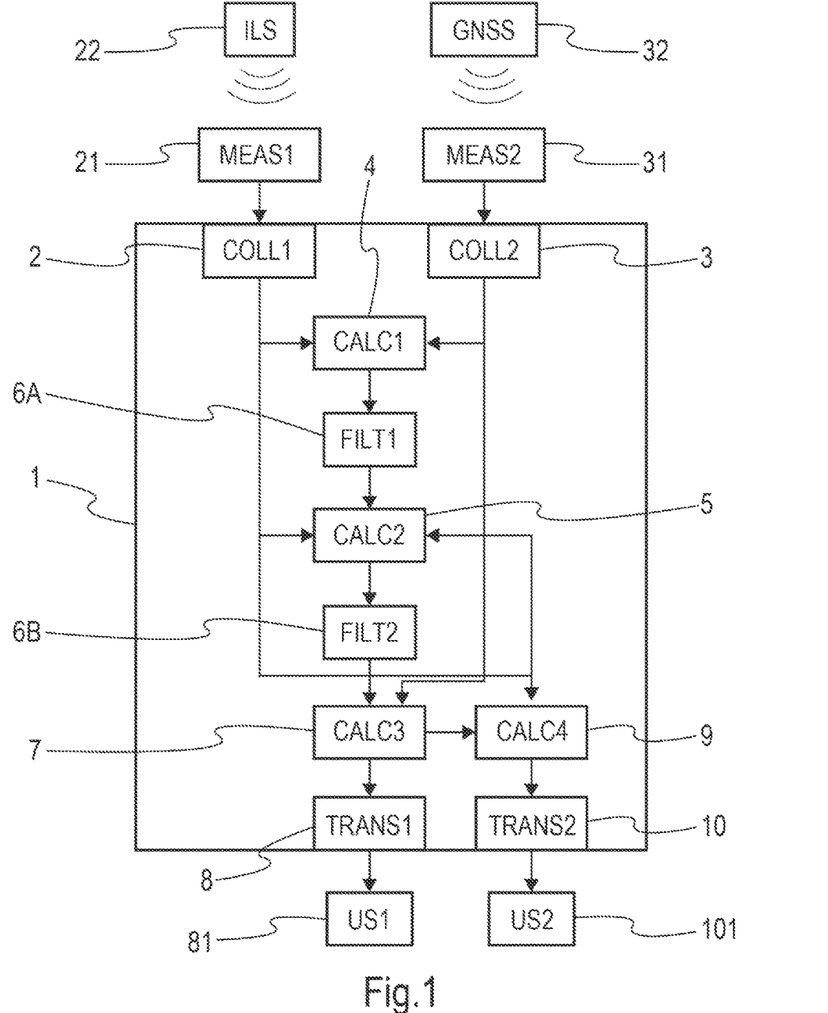
FIG. 1 schematically shows the determination system.
Figure 2:
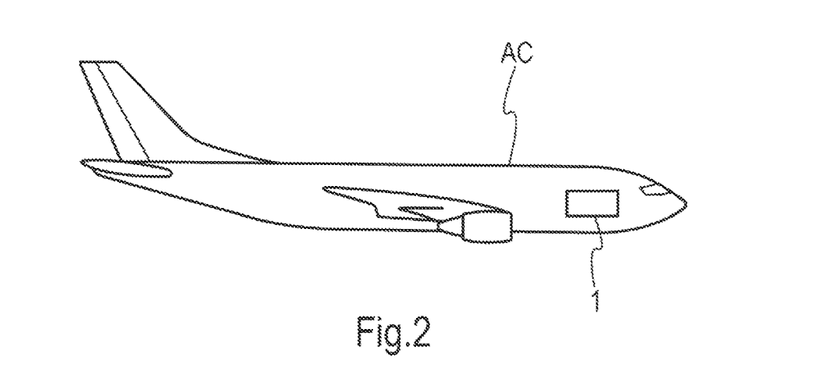
FIG. 2 shows a profile view of an aircraft with the determination system on board.

FIG. 1 shows the system 1 for determining a position error of an aircraft AC, for example, a transport plane, in particular, during an approach phase with a view to landing on a runway RWY. The position error is determined using a landing assistance device.

Figure 4A:
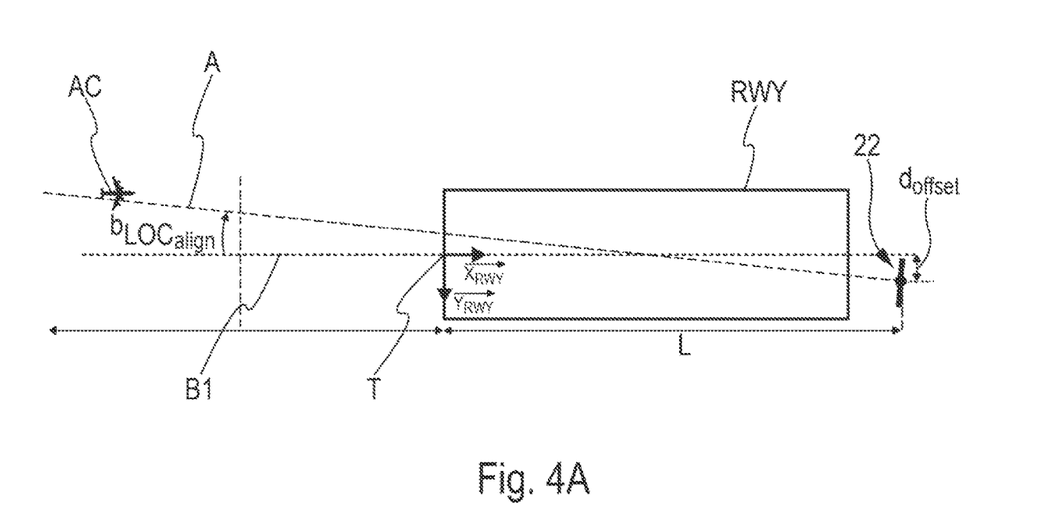
FIG. 4A shows a top view of a runway and of an aircraft in an approach phase with a view to landing on the runway.

The runway RWY has a longitudinal axis B1 and a threshold T (FIG. 4A).

The determination system 1 comprises at least the following modules implemented in an iterative manner:

a first set of collection modules implemented in each iteration of a set of iterations i, i+N1, i+N1+N2 (with N1 and N2 being strictly positive whole numbers); and a second set of computation modules.

The first set of modules comprises:

an offset collection module 2 COLL1; and a position vector collection module 3 COLL2.

Each of the modules 2 and 3 of the first set of modules is implemented in each iteration. An offset or a position is considered to be current when it is collected in the current iteration.

The offset collection module 2 is configured to collect a current offset measured by an offset measurement module 21 MEAS1 based on a reference guidance signal transmitted by the ground-based transmitting station 22 of a landing assistance device.

The landing assistance device can correspond to a device of the ILS system type. The landing assistance device comprises at least one ILS transmitting station 22 (ground-based) of a runway RWY configured to transmit a reference guidance signal. This guidance signal defines a reference guidance axis A.

In a first embodiment, the considered reference guidance axis A is a lateral guidance axis. The transmitting station 22 is then a station of the LOC ("Localizer beacon") type configured to transmit a reference lateral guidance signal. This lateral guidance signal defines the reference lateral guidance axis A. The offset measured by the offset measurement module 21 is then a current lateral offset $\eta_{LOC_{\mu A}}$.

The current lateral offset $\eta_{LOC_{\mu A}}$ can be measured in microamperes. The lateral offset is zero when the aircraft follows a path aligned with the reference lateral guidance axis A.

In a second embodiment, the considered reference guidance axis A is a vertical guidance axis. The transmitting station 22 is then a station of the Glide ("Glide slope beacon") type configured to transmit a reference vertical guidance signal, corresponding to a signal of the "Glide Slope signal" type. This vertical guidance signal defines the reference vertical guidance axis A. The offset measured by the offset measurement module 21 is then a current vertical offset $\eta_{GS_{ddm}}$, $\eta_{GS_{rad}}$.

The current vertical offset $\eta_{GS_{ddm}}$, $\eta_{GS_{rad}}$ can be measured in radians in relation to the reference vertical guidance axis A. It also can be measured as DDM ("Difference in Depth of Modulation"). In practice, it is expressed as a percentage or in microamperes. This vertical guidance signal has two parts. Each of the parts is transmitted at a different frequency to one another. The DDM corresponds to a difference between the depth of modulation of a part transmitted at one frequency and the depth of modulation of the other part transmitted at another frequency. The vertical offset in radians or as DDM is zero when the aircraft follows a path aligned with the reference vertical guidance axis A.

The position vector collection module 3 is configured to collect a current position vector of the aircraft AC measured by a position vector measurement module 31 MEAS2 based on signals transmitted by a geopositioning system 32 GNSS. Advantageously, the position vector is expressed in a coordinate system associated with the runway RWY. The current position vector comprises at least one current longitudinal position $x_{RWY}$ and a current lateral position $y_{RWY}$ in the first embodiment (respectively a current vertical position $z_{RWY}$ in the second embodiment). The geopositioning system can correspond to a geolocation and navigation system using a GNSS ("Global Navigation Satellite System"), such as a GPS ("Global Positioning System").

The determination system 1 also comprises a second set of computation modules comprising:

a computation module 4 CALC1 implemented in a first iteration i;

a computation module 5 CALC2 implemented in a second iteration i+N1 subsequent to the first iteration i;

a computation module 7 CALC3 implemented in a third iteration i+N1+N2 subsequent to the second iteration i+N1.

Therefore, the modules 4, 5 and 7 are implemented sequentially.

Numbers N1 and N2 are selected so that the distances covered by the aircraft between iterations i and i+N1, on the one hand, and between iterations i+N1 and i+N1+N2, on the other hand, are sufficient to allow sufficient precision for the various computations. For example, if iteration i corresponds to a distance from the aircraft to the runway threshold that is equal to 5 nautical miles (approximately 9.3 km), the number N1 can be selected so that iteration i+N1 corresponds to a distance from the aircraft to the runway threshold that is equal to 4 nautical miles (approximately 7.4 km) and the number N2 can be selected so that iteration i+N1+N2 corresponds to a distance from the aircraft to the runway threshold that is equal to 3 nautical miles (approximately 5.6 km). Numbers N1 and N2 are particularly determined as a function of a computation cycle time (corresponding to the transition from an iteration i to an iteration i+1) of the one or more avionics computers implementing modules 4, 5 and 7, so as to correspond to the aforementioned distances.

In the first embodiment, the computation module 4 is configured to compute an angular alignment bias $b_{LOC_{align}}$ of the reference lateral guidance axis A in relation to the longitudinal axis B1 of the runway RWY based on the current lateral offset $\eta_{LOC_{\mu A}}$, the current longitudinal position $x_{RWY}$ and the current lateral position $y_{RWY}$. The longitudinal axis B1 of the runway corresponds to the lateral component of the approach axis of the runway.

The longitudinal axis B1 of the runway corresponds to an axis separating the runway RWY into two substantially identical parts along the length of the runway RWY. The threshold T of the runway RWY corresponds to the origin of an orthonormal frame of reference (T, $\vec{x}_{RWY}$, $\vec{y}_{RWY}$, $\vec{z}_{RWY}$) covered by the longitudinal axis B1 of the runway RWY.

Figure 4B:
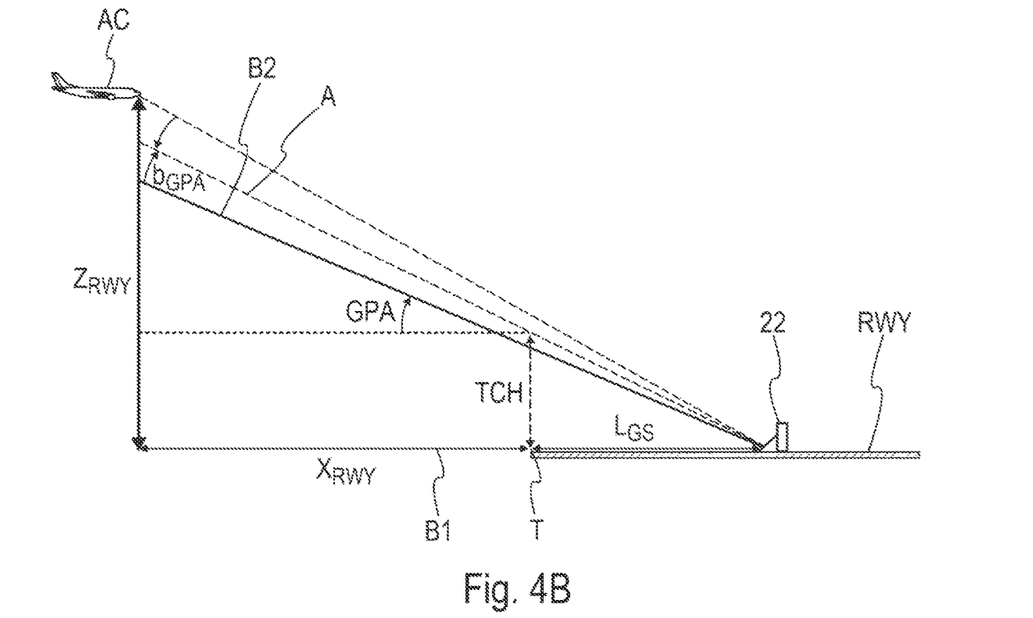
FIG. 4B shows a profile view of a runway and of an aircraft in an approach phase with a view to landing on the runway.

In practice, the actual reference guidance axis is not perfectly straight, in particular due to multiple paths of the guidance signals transmitted by the station 22 due to the environment. The reference guidance axis A considered in the remainder of the invention is straight, as shown in FIGS. 4A and 4B. It corresponds to an approximation of the actual reference guidance axis that is obtained, for example, by an average, by smoothing or by a linear interpolation of the actual reference guidance axis.

According to the preferred embodiment, the angular alignment bias $b_{LOC_{align}}$ is computed by the computation module 4 using the following relation:

$$b_{LOC_{align}} = \arcsin\left(\frac{b_{LOC_{offset}} - \frac{\eta_{LOC_{\mu A}} \times 0.7 (L - x_{RWY})}{L} - y_{RWY}}{L - x_{RWY}}\right),$$

wherein:

$b_{LOC_{offset}}$ corresponds to the lateral position (in meters) of the transmitting station 22 in relation to the longitudinal axis B1 of the runway RWY;

$\eta_{LOC_{\mu A}}$ corresponds to the current lateral offset measured in microamperes by the offset measurement module 21;

$x_{RWY}$ corresponds to the current longitudinal position collected (in meters) by the position vector collection module 3;

$y_{RWY}$ corresponds to the current lateral position collected (in meters) by the position vector collection module 3;

L corresponds to the longitudinal position (in meters) of the transmitting station 22 in relation to the threshold T of the runway RWY.

The angular alignment bias $b_{LOC_{align}}$ is tainted by the lateral position error by generated by the position vector measurement module 31. The value of the angular alignment bias $b_{LOC_{align}}$ that is computed thus is set for the remainder of the computations.

The computation module 5 is configured to compute an observable lateral position bias $b_{y_{obs}}$ based on the angular alignment bias $b_{LOC_{align}}$ computed in the first iteration i, the current lateral offset $\eta_{LOC_{align}}$ the current longitudinal position $x_{RWY}$ and the current lateral position $y_{RWY}$.

According to the preferred embodiment, the observable lateral position bias $b_{y_{obs}}$ is computed by the computation module 5 using the following relation:

$$b_{y_{obs}} = y_{RWY} - b_{LOC_{offset}} - (L - x_{RWY})\sin(b_{LOC_{align}}) - \frac{\eta_{LOC_{\mu A}} \times 0.7 \times (L - x_{RWY})}{L},$$

wherein:

$\eta_{LOC_{\mu A}}$ corresponds to the current lateral offset measured in microamperes by the offset measurement module 21;

$b_{LOC_{offset}}$ corresponds to the lateral position (in meters) of the transmitting station 22 in relation to the longitudinal axis B of the runway RWY;

$b_{LOC_{align}}$ corresponds to the angular alignment bias (in radians) computed by the computation module 4;

$x_{RWY}$ corresponds to the current longitudinal position collected (in meters) by the position vector collection module 3;

$y_{RWY}$ corresponds to the current lateral position collected (in meters) by the position vector collection module 3;

L corresponds to the longitudinal position (in meters) of the transmitting station 22 in relation to the threshold T of the runway RWY.

According to an alternative embodiment, the determination system 1 further comprises a filtering module 6A FILT1 configured to filter the angular alignment bias $b_{LOC_{align}}$ computed by the computation module 4.

The filtering is computed, for example, on k1 successive iterations, with 0<k1<N2. This filtering can correspond to a computation of the average of the angular alignment bias $b_{LOC_{align}}$ based on angular alignment bias $b_{LOC_{align}}$ computed in previous iterations.

According to another alternative embodiment, the determination system 1 further comprises a filtering module 6B FILT2 configured to filter the observable lateral position bias $b_{y_{obs}}$ computed by the computation module 5.

The filtering is computed, for example, on m1 successive iterations, with 0<m1. This filtering can correspond to a computation of the average of the observable lateral position bias $b_{y_{obs}}$ based on observable lateral position bias $b_{y_{obs}}$ computed in previous iterations.

The computation module 7 is configured to compute the lateral position error by based on the observable lateral position bias $b_{y_{obs}}$ computed in the second iteration i+N1, the current longitudinal position $x_{RWY}$ and the longitudinal position measured in the first iteration i.

According to the preferred embodiment, the lateral position error $b_y$ is computed by the computation module 7 using a spatial extrapolation that can be defined, in a non-limiting manner, by the following relation:

$$b_y = b_{y_{obs}} \frac{L + x_{b_{LOC_{align}}}}{x_{RWY} - x_{b_{LOC_{align}}}},$$

wherein:

$$x_{b_{LOC_{align}}}$$

corresponds to the longitudinal position measured (in meters) by the position vector measurement module 31 during the first iteration i;

$b_{y_{obs}}$ corresponds to the observable lateral position bias (in meters) computed by the computation module 5;

$x_{RWY}$ corresponds to the current longitudinal position collected (in meters) by the position vector collection module 3;

L corresponds to the longitudinal position (in meters) of the transmitting station 22 in relation to the threshold T of the runway RWY.

In an alternative embodiment, the lateral position error $b_y$ is determined by computing a gradient of the observable lateral position $b_{y_{obs}}$. This gradient corresponds to a temporal gradient. The value of the position bias is then extrapolated in relation to the time remaining until landing.

The determination system 1 further comprises a transmission module 8 TRANS1 configured to transmit the lateral position error $b_y$ to a user device 81 US1.

The determination system 1 can also comprise:

a computation module 9 CALC4; and a transmission module 10 TRANS2.

The computation module 9 is configured to compute a corrected angular alignment bias $$b_{LOC_{align_{TRUE}}}$$

based on the current lateral offset $\eta_{LOC_{\mu A}}$, the current longitudinal position $x_{RWY}$, the current lateral position $y_{RWY}$ and the lateral position error $b_y$ computed by the computation module 7.

The corrected angular alignment bias b $$b_{LOC_{align_{TRUE}}}$$

can be computed by the computation module 9 using the following relation:

$$b_{LOC_{align_{TRUE}}} = \arcsin\left(\frac{b_{LOC_{offset}} - \frac{\eta_{LOC_{\mu A}} \times 0.7(L - x_{RWY})}{L} - y_{RWY} + b_y}{L - x_{RWY}}\right).$$

The transmission module 10 is configured to transmit the corrected angular alignment bias $$\left(b_{LOC_{align_{TRUE}}}\right)$$

to a second user device 101 US2.

Determining the lateral position error $b_y$ makes it possible to know whether a realignment of the aircraft AC is necessary. If the lateral position error $b_y$ is non-zero, a realignment is necessary, either by the pilot of the aircraft AC, or by the automatic pilot of the aircraft AC. This can also indicate a failure in the reference lateral guidance signal or erroneous data from information from the database that is used that relates to the runway RWY. In this case, a "go round" may need to be performed if the value of the lateral position error $b_y$ is too high.

Figure 5A:
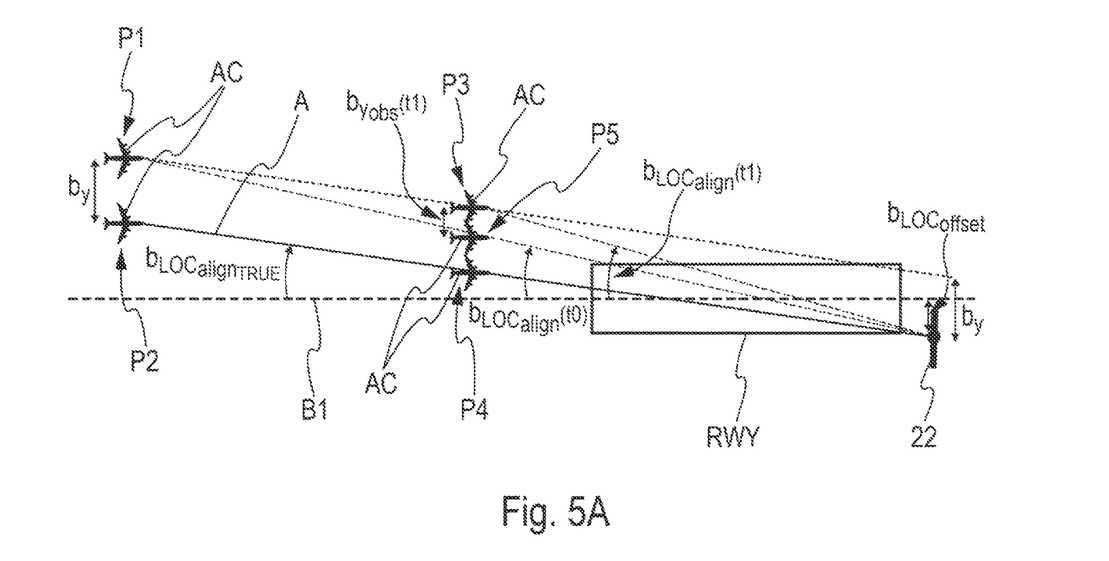
FIG. 5A shows a top view of a runway and of an aircraft at positions measured by the position vector measurement module and actual positions of the aircraft.

FIG. 5A shows several positions P1, P2, P3, P4 and P5 of an aircraft AC. Positions P1 and P3 represent positions determined in two different iterations (with $t_0$ corresponding to the first iteration i and $t_1$ corresponding to the second iteration i+N1) and by the position vector measurement module 31. Positions P2 and P4 represent actual positions of the aircraft AC in the same iterations. The determination system 1 allows the lateral position error $b_y$ to be determined between positions P1 and P2 and between positions P3 and P4.

Position P5 in the second iteration i+N1 corresponds to a position determined with the observable lateral position bias $b_{y_{obs}}$ by considering the angular alignment bias $b_{LOC_{align}}$ computed in the first iteration i.

In the second embodiment, the computation module 4 is configured to compute an angular alignment bias $b_{GPA}$ of the reference vertical guidance axis A in relation to a nominal approach descent axis B2 based on the current vertical offset $\eta_{GS_{ddm}}$, $\eta_{GS_{rad}}$, the current longitudinal position $x_{RWY}$ and the current vertical position $z_{RWY}$. The axis of the nominal approach descent path B2, as shown in FIG. 4B, corresponds to the vertical component of the approach axis of the runway. It generally forms an angle GPA of 3° with the longitudinal axis B1 of the runway RWY.

According to a preferred embodiment, the angular alignment bias $b_{GPA}$ is computed by the computation module 4 using the following relation:

$$b_{GPA} = \frac{GPA - \mathrm{sign}\,(\eta_{GS_{ddm}}) \frac{0.12 \times GPA \times \eta_{GC_{ddm}}}{0.0875} - \arctan\left(\frac{z_{RWY}}{x_{RWY} + \frac{TCH}{\tan GPA}}\right)}{1 + \frac{0.12 \times \mathrm{sign}\,(\eta_{GS_{ddm}}) \times \eta_{GS_{ddm}}}{0.0875}},$$

wherein:

GPA corresponds to an angle (in radians) of the nominal descent approach axis B2 with the longitudinal axis B1 of the runway RWY;

$\eta_{GS_{ddm}}$ corresponds to the current vertical offset measured as DDM by the offset measurement module 21;

$x_{RWY}$ corresponds to the current longitudinal position collected (in meters) by the position vector collection module 3;

$z_{RWY}$ corresponds to the current vertical position collected (in meters) by the position vector collection module 3;

TCH corresponds to a height at which the vertical offset is zero at a position in line with the threshold T of the runway RWY.

The angular alignment bias $b_{GPA}$ is tainted by the vertical position error $b_z$ generated by the position vector measurement module 31. The value of the angular alignment bias $b_{GPA}$ that is thus computed is set for the remainder of the computations.

The computation module 5 is configured to compute an observable vertical position bias $b_{z_{obs}}$ based on the angular alignment bias $b_{GPA}$ computed in the first iteration i, the current vertical offset $\eta_{GS_{ddm}}$, $\eta_{GS_{rad}}$, the current longitudinal position $x_{RWY}$ and the current vertical position $z_{RWY}$.

According to the preferred embodiment, the observable vertical position bias $b_{z_{obs}}$ is computed by the computation module 5 using the following relation:

$$b_{z_{obs}} = z_{RWY} - \left(x_{RWY} + \frac{TCH}{\tan(GPA)}\right)\tan(GPA - b_{GPA} - \eta_{GS_{rad}}),$$

wherein:

$\eta_{GS_{rad}}$ corresponds to the current vertical offset measured in radians by the offset measurement module 21;

$b_{GPA}$ corresponds to the angular alignment bias (in radians) computed by the computation module 4;

$x_{RWY}$ corresponds to the current longitudinal position collected (in meters) by the position vector collection module 3;

$z_{RWY}$ corresponds to the current vertical position collected (in meters) by the position vector collection module 3.

According to an alternative embodiment, the determination system 1 further comprises a filtering module 6A FILT1 configured to filter the angular alignment bias $b_{GPA}$ computed by the computation module 4.

The filtering is computed, for example, on k2 successive iterations, with 0<k2<N2. This filtering can correspond to a computation of the average of the angular alignment bias $b_{GPA}$ based on angular alignment bias $b_{GPA}$ computed in previous iterations.

According to an alternative embodiment, the determination system 1 further comprises a filtering module 6B FILT2 configured to filter the observable vertical position bias $b_{z_{obs}}$ computed by the computation module 5.

The filtering is computed, for example, on m2 successive iterations, with 0<m2. This filtering can correspond to a computation of the average of the observable vertical position bias $b_{z_{obs}}$ based on observable vertical position bias $b_{z_{obs}}$ computed in previous iterations.

The computation module 7 is configured to compute the vertical position error $b_z$ based on the observable vertical position bias $b_{z_{obs}}$ computed in the second iteration i+N1, the current longitudinal position $x_{RWY}$ and the longitudinal position measured in the first iteration i.

According to the preferred embodiment, the vertical position error $b_z$ is computed by the computation module 7 using a spatial extrapolation that can be defined, in a non-limiting manner, by the following relation:

$$b_z = b_{z_{obs}} \frac{L_{GS} + x_{b_{GPA}}}{x_{RWY} - x_{b_{GPA}}},$$

wherein:

$x_{b_{GPA}}$ corresponds to the longitudinal position measured (in meters) by the position vector measurement module 31 during the first iteration i;

$b_{GPA}$ corresponds to the angular alignment bias computed (in radians) by the computation module 4 in the first iteration i;

$x_{RWY}$ corresponds to the current longitudinal position collected (in meters) by the position vector collection module 3;

$L_{GS}$ corresponds to a longitudinal distance (in meters) between the transmitting station and the threshold of the runway.

The longitudinal distance $L_{GS}$ between the transmitting station 22 and the threshold T of the runway RWY can be computed based on the following relation:

$$L_{GS} = \frac{TCH}{\tan(GPA - \hat{b}_{GPA})},$$

wherein $\hat{b}_{GPA}$ corresponds to an estimate of the angular alignment bias $b_{GPA}$.

In an alternative embodiment, the vertical position error $b_z$ is determined by computing an observable vertical position gradient $b_{z_{obs}}$. This gradient corresponds to a temporal gradient in relation to the time remaining until landing. The value of the position bias is subsequently extrapolated.

The determination system 1 further comprises a transmission module 8 TRANS1 configured to transmit the vertical position error $b_z$ to a user device 81 US1.

The determination system 1 can also comprise:

a computation module 9 CALC4; and a transmission module 10 TRANS2.

The computation module 9 is configured to compute a corrected angular alignment bias $b_{GPA_{TRUE}}$ based on the current vertical offset $\eta_{GS_{ddm}}$, $\eta_{GS_{rad}}$, the current longitudinal position $x_{RWY}$, the current vertical position $z_{RWY}$ and the vertical position error $b_z$ computed by the computation module 7.

The corrected angular alignment bias $b_{GPA_{TRUE}}$ can be computed by the computation module 9 using the following relation:

$$b_{GPA_{TRUE}} = \frac{GPA - \text{sign}(\eta_{GS_{ddm}})\frac{0.12 \times GPA \times \eta_{GC_{ddm}}}{0.0875} - \arctan\left(\frac{z_{RWY} - b_z}{x_{RWY} + \frac{TCH}{\tan GPA}}\right)}{1 + \frac{0.12 \times \text{sign}(\eta_{GS_{ddm}}) \times \eta_{GS_{ddm}}}{0.0875}}$$

The transmission module 10 is configured to transmit the corrected angular alignment bias $b_{GPA_{TRUE}}$ to a user device 101 US2.

Determining the vertical position error $b_z$ makes it possible to know whether a realignment of the aircraft AC is necessary. If the vertical position error $b_z$ is non-zero, a realignment is necessary, either by the pilot of the aircraft AC, or by the automatic pilot of the aircraft AC. This can also indicate a failure in the reference vertical guidance signal or erroneous data from information from the database that is used that relates to the runway RWY. In this case, a "go round" may need to be performed if the value of the vertical position error $b_z$ is too high.

Figure 5B:
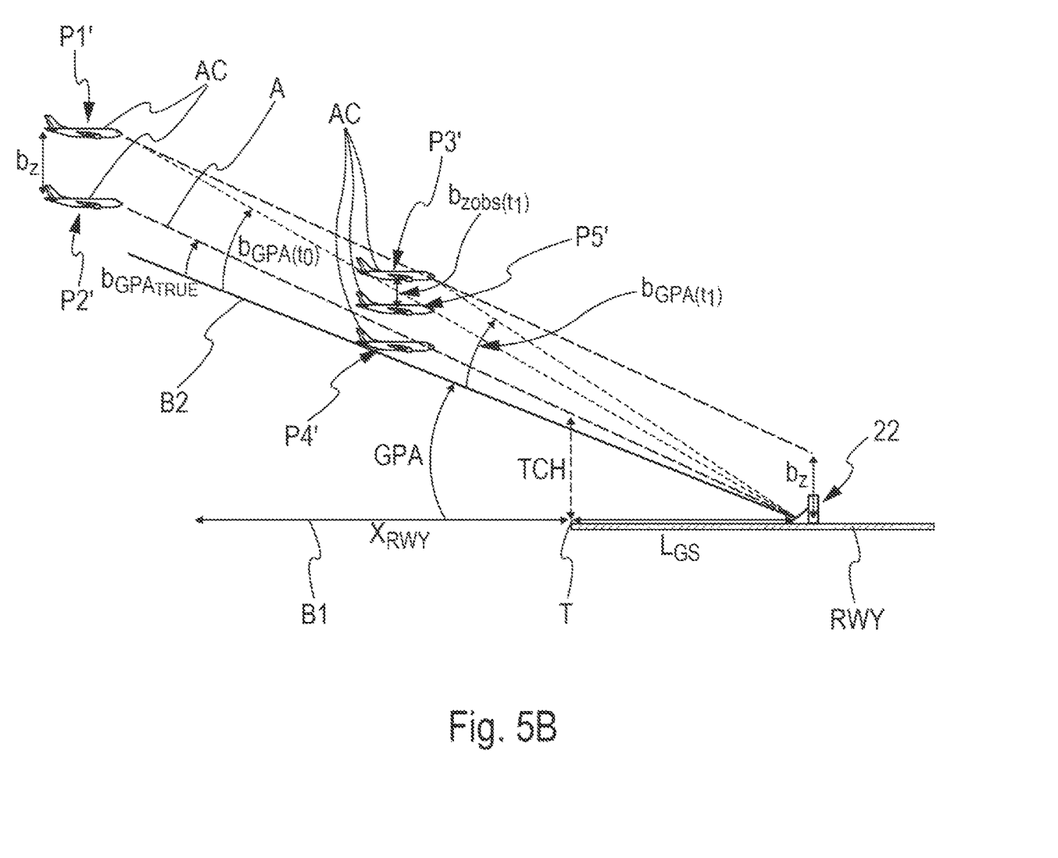
FIG. 5B shows a profile view of a runway and of an aircraft at positions measured by the position vector measurement module and actual positions of the aircraft.

FIG. 5B shows several positions P1', P2', P3', P4' and P5' of an aircraft AC. Positions P1' and P3' represent positions determined in two different iterations (with $t_0$ corresponding to the first iteration i and $t_1$ corresponding to the second iteration i+N1) and by the position vector measurement module 31. Positions P2' and P4' represent actual positions of the aircraft AC in the same iterations. The determination system 1 allows the vertical position error $b_z$ to be determined between positions P1' and P2' and between positions P3' and P4'.

Position P5' in the second iteration i+N1 corresponds to a position determined with the observable vertical position bias $b_{z_{obs}}$ by considering the angular alignment bias $b_{GPA}$ computed in the first iteration i.

Figure 3:
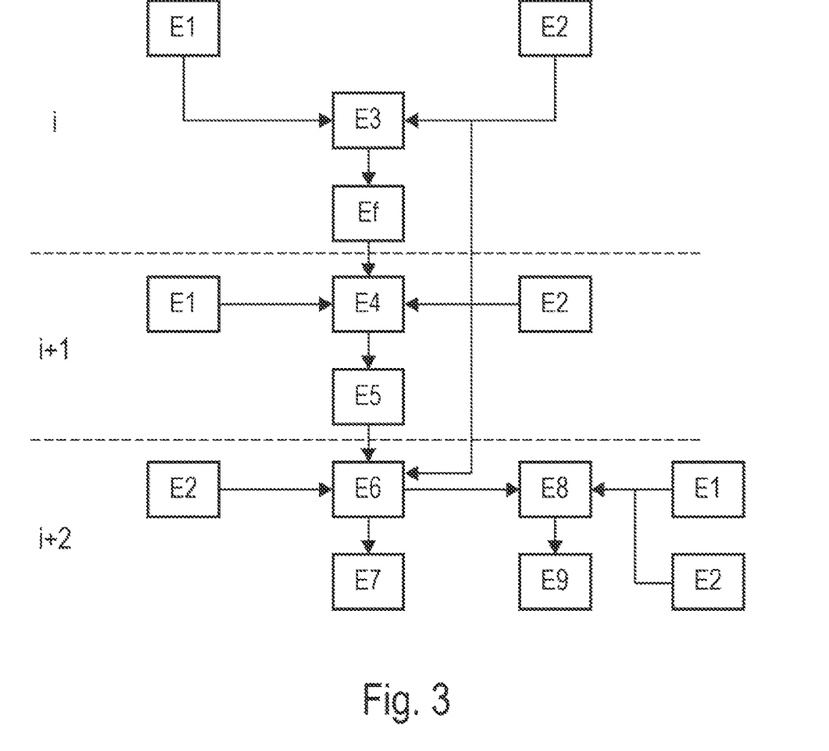
FIG. 3 schematically shows the determination method.

The invention also relates to a method for determining a position error of an aircraft AC (FIG. 3).

The determination method comprises at least the following steps implemented in an iterative manner:

a first set of collection steps implemented in each iteration (i, i+N1, i+N1+N2), the first set of steps comprising:

an offset collection step E1, implemented by the offset collection module 2, involving collecting a current lateral offset $\eta_{LOC_{\mu4}}$ in the first embodiment (respectively a current vertical offset $\eta_{GS_{ddm}}$, $\eta_{GS_{rad}}$ in the second embodiment) measured by the offset measurement module 21 based on the reference guidance signal transmitted by the transmitting station 22 of the landing assistance device;

a position vector collection step E2, implemented by the position vector collection module 3, involving collecting a current position vector of the aircraft AC measured by the position vector measurement module 31 based on signals transmitted by a geopositioning system 32, the current position vector comprising at least one current longitudinal position $x_{RWY}$ and a current lateral position $y_{RWY}$ in the first embodiment (respectively a current vertical position $z_{RWY}$ in the second embodiment);

a second set of computation steps comprising:

a first computation step E3, implemented by the computation module 4 in a first iteration i, involving computing an angular alignment bias $b_{LOC_{align}}$ (respectively $b_{GPA}$) of the reference guidance axis A in relation to the approach axis B1 (respectively B2) of the runway RWY based on the current offset $\eta_{LOC_{\mu4}}$ (respectively $\eta_{GS_{ddm}}$, $\eta_{GS_{rad}}$), the current longitudinal position $x_{RWY}$ and the current lateral position $y_{RWY}$ (respectively the current vertical position $z_{RWY}$);

a computation step E4, implemented by the computation module 5 in a second iteration i+N1 subsequent to the first iteration i, involving computing an observable position bias $b_{y_{obs}}$ (respectively $b_{z_{obs}}$) based on the angular alignment bias $b_{LOC_{align}}$ (respectively $b_{GPA}$) computed in the first iteration i, the current offset $\eta_{LOC_{\mu4}}$ (respectively $\eta_{GS_{ddm}}$, $\eta_{GS_{rad}}$), the current longitudinal position $x_{RWY}$ and the current lateral position $y_{RWY}$ (respectively the current vertical position $z_{RWY}$);

a computation step E6, implemented by the computation module 7 in a third iteration i+N1+N2 subsequent to the second iteration i+N1, involving computing the lateral position error $b_y$ (respectively the vertical position error $b_z$) based on the observable lateral position bias $b_{y_{obs}}$ (respectively the observable vertical position bias $b_{z_{obs}}$) computed in the second iteration i+N1, the current longitudinal position $x_{RWY}$ and the longitudinal position measured in the first iteration i;

a first transmission step E7, implemented by the transmission module 8, involving transmitting the lateral position error $b_y$ (respectively the vertical position error $b_z$) to a user device 81.

Advantageously, the position vector of the aircraft is expressed in a coordinate system associated with the runway RWY.

The method can further comprise a filtering step Ef, implemented by the filtering module 6A, involving filtering the angular alignment position bias $b_{LOC_{align}}$ (respectively the angular alignment bias $b_{GPA}$) computed in the computation step E3.

The method can further comprise a filtering step E5, implemented by the filtering module 6B, involving filtering the observable lateral position bias $b_{y_{obs}}$ (respectively the observable vertical position bias $b_{z_{obs}}$) computed in the computation step E4.

The method can also comprise:

a computation step E8, implemented by the computation module 9, involving computing a corrected angular alignment bias $$b_{LOC_{align_{TRUE}}}$$

(respectively $b_{GPA_{TRUE}}$) based on the current lateral offset $\eta_{LOC_{\mu4}}$ (respectively based on the current vertical offset $\eta_{GS_{ddm}}$, $\eta_{GS_{rad}}$), the current longitudinal position $x_{RWY}$, the current lateral position $y_{RWY}$ (respectively the current vertical position $z_{RWY}$) and the lateral position error $b_y$ (respectively the vertical position error $b_z$) computed in computation step E6;

a transmission step E9, implemented by a transmission module 10, involving transmitting the corrected angular alignment bias $$b_{LOC_{align_{TRUE}}}$$

(respectively $b_{GPA_{TRUE}}$) to a user device 101.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a position error of an aircraft during an approach procedure of the aircraft with a view to landing on a runway, comprising at least the following steps implemented in an iterative manner:
a first set of collection steps implemented in each iteration, the first set of collection steps comprising:
an offset collection step, implemented by an offset collection module, involving collecting a current offset measured by an offset measurement module based on a reference guidance signal transmitted by a transmitting station of a landing assistance device, the landing assistance device comprising at least a ground-based transmitting station configured to transmit the reference guidance signal defining a reference guidance axis, the runway having a longitudinal axis and a threshold;
a position vector collection step, implemented by a position vector collection module, involving collecting a current position vector of the aircraft measured by a position vector measurement module based on signals transmitted by a geopositioning system, the current position vector comprising a current longitudinal position and at least one from among a current lateral position and a current vertical position;
a second set of computation steps comprising:
a first computation step, implemented by a first computation module in a first iteration, involving computing an angular alignment bias of the reference guidance axis in relation to an approach axis of the runway based on the current offset, the current longitudinal position and said at least one from among the current lateral position and the current vertical position;
a second computation step, implemented by a second computation module in a second iteration subsequent to the first iteration, involving computing an observable position bias based on the angular alignment bias computed in the first iteration, the current offset, the current longitudinal position and said at least one from among the current lateral position and the current vertical position;
a third computation step, implemented by a third computation module in a third iteration subsequent to the second iteration, involving computing the position error based on the observable position bias computed in the second iteration, the current longitudinal position and a longitudinal position measured in a previous iteration;
a first transmission step, implemented by a first transmission module, involving transmitting the position error to a first user device; and, realigning, by an automatic pilot of the aircraft, the aircraft based on the position error.

2. The method according to claim 1, further comprising a filtering step, implemented by a filtering module, involving filtering at least one of the following two biases:
the angular alignment bias computed in the first computation step; and
the observable position bias computed in the second computation step.

3. The method according to claim 1, further comprising:
a fourth computation step, implemented by a fourth computation module, involving computing a corrected angular alignment bias based on the current offset, the current longitudinal position, said at least one from among the current lateral position and the current vertical position and the position error computed in the third computation step;
a second transmission step, implemented by a second transmission module, involving transmitting the corrected angular alignment bias to a second user device.

4. The method according to claim 1, wherein, when said at least one from among the current lateral position and the current vertical position corresponds to the current lateral position, the angular alignment bias is computed in the first computation step using the following relation:

$$b_{LOC_{align}} = \arcsin\left(\frac{b_{LOC_{offset}} - \frac{\eta_{LOC_{\mu A}} \times 0.7(L-x_{RWY})}{L} - y_{RWY}}{L - x_{RWY}}\right),$$

wherein:
- $b_{LOC_{offset}}$ corresponds to a lateral position of the ground-based transmitting station in relation to the longitudinal axis of the runway;
- $n_{LOC_{\mu A}}$ corresponds to a current lateral offset measured in microamperes by the offset measurement module;
- $x_{RWY}$ corresponds to the current longitudinal position collected by the position vector collection module;
- $y_{RWY}$ corresponds to the current lateral position collected by the position vector collection module;
- L corresponds to the longitudinal position of the transmitting station in relation to the threshold of the runway.

5. The method according to claim 1, wherein, when said at least one from among the current lateral position and the current vertical position corresponds to the current lateral position, an observable lateral position bias is computed in the second computation step using the following relation:

$$b_{y_{obs}} = y_{RWY} - b_{LOC_{offset}} - (L-x_{RWY})\sin(b_{LOC_{align}}) - \frac{\eta_{LOC_{\mu A}} \times 0.7 \times (L-x_{RWY})}{L},$$

wherein:
- $\eta_{GS_{rad}}$ corresponds to a current lateral offset measured in radians by the offset measurement module;
- $b_{LOC_{offset}}$ corresponds to a lateral position of the ground-based transmitting station in relation to the longitudinal axis of the runway;
- $b_{LOC_{align}}$ corresponds to the angular alignment bias computed in the first computation step;
- $x_{RWY}$ corresponds to the current longitudinal position collected by the position vector collection module;
- $y_{RWY}$ corresponds to the current lateral position collected by the position vector collection module;
- L corresponds to a longitudinal position of the ground-based transmitting station in relation to the threshold of the runway.

6. The method according to claim 1, wherein, when said at least one from among the current lateral position and the current vertical position corresponds to the current lateral position, a lateral position error is computed in the third computation step in one of the following two manners:
- by computing a temporal gradient of the observable lateral position bias, then extrapolating the value of a bias at a transmitting beacon as a function of said temporal gradient; or
- using a spatial extrapolation defined by the following relation:

$$b_y = b_{y_{obs}} \frac{L + x_{b_{LOC_{align}}}}{x_{RWY} - x_{b_{LOC_{align}}}},$$

wherein:

$x_{b_{LOC_{align}}}$ corresponds to the longitudinal position measured during the previous iteration;
- $b_{y_{obs}}$ corresponds to the observable lateral position bias computed in the second step;
- $x_{RWY}$ corresponds to the current longitudinal position collected by the position vector collection module;
- L corresponds to a longitudinal position of the ground-based transmitting station in relation to the threshold of the runway.

7. The method according to claim 3, wherein, when said at least one from among the current lateral position and the current vertical position corresponds to the current lateral position, the corrected angular alignment bias is computed in the fourth computation step using the following relation:

$$b_{LOC_{align_{TRUE}}} = \arcsin\left(\frac{b_{LOC_{offset}} - \frac{\eta_{LOC_{\mu A}} \times 0.7(L-x_{RWY})}{L} - y_{RWY} + b_y}{L - x_{RWY}}\right).$$

8. The method according to claim 1, wherein, when said at least one from among the current lateral position and the current vertical position corresponds to the current vertical position, the angular alignment bias is computed in the first computation step using the following relation:

$$b_{GPA} = \frac{GPA - \text{sign}(\eta_{GS_{ddm}})\frac{0.12 \times GPA \times \eta_{GC_{ddm}}}{0.0875} - \arctan\left(\frac{z_{RWY} - b_z}{x_{RWY} + \frac{TCH}{\tan GPA}}\right)}{1 + \frac{0.12 \times \text{sign}(\eta_{GS_{ddm}}) \times \eta_{GS_{ddm}}}{0.0875}},$$

wherein:
- GPA corresponds to an angle of the approach axis with the longitudinal axis of the runway;
- $\eta_{GS_{ddm}}$ corresponds to a current vertical offset measured as DDM by the offset measurement module;
- $x_{RWY}$ corresponds to the current longitudinal position collected by the position vector collection module;
- $z_{RWY}$ corresponds to the current vertical position collected by the position vector collection module;
- TCH corresponds to a height at which a vertical offset is zero at a position in line with the threshold of the runway.

9. The method according to claim 1, wherein, when said at least one from among the current lateral position and the current vertical position corresponds to the current vertical position, an observable vertical position bias is computed in the second computation step using the following relation:

$$b_{z_{obs}} = z_{RWY} - \left(x_{RWY} + \frac{TCH}{\tan(GPA)}\right)\tan(GPA - b_{GPA} - \eta_{GS_{rad}}),$$

wherein:
- $\eta_{GS_{rad}}$ corresponds to a current vertical offset measured in radians by the offset measurement module;

$b_{GPA}$ corresponds to the angular alignment bias computed in the first computation step;

$x_{RWY}$ corresponds to the current longitudinal position collected by the position vector collection module;

$z_{RWY}$ corresponds to the current vertical position collected by the position vector collection module.

10. The method according to claim 1, wherein, when said at least one from among the current lateral position and the current vertical position corresponds to the current vertical position, a vertical position error is computed in the third computation step in one of the following two manners:

by computing a temporal gradient of an observable vertical position bias, then extrapolating a value of a bias at a transmitting beacon as a function of said temporal gradient; or using a spatial extrapolation defined by the following relation:

$$b_z = b_{z_{obs}} \frac{L_{GS} + x_{b_{GPA}}}{x_{RWY} - x_{b_{GPA}}},$$

wherein:

$x_{b_{GPA}}$ corresponds to the longitudinal position measured during the previous iteration;

$b_{GPA}$ corresponds to the angular alignment bias computed in the first computation step;

$x_{RWY}$ corresponds to the current longitudinal position collected by the position vector collection module;

$L_{GS}$ corresponds to a longitudinal distance between the transmitting station and the threshold of the runway.

11. The method according to claim 3, wherein, when said at least one from among the current lateral position and the current vertical position corresponds to the current vertical position, the corrected angular alignment bias is computed in the fourth step using the following relation:

$$b_{GPA_{TRUE}} = \frac{GPA - \text{sign}(\eta_{GS_{ddm}}) \frac{0.12 \times GPA \times \eta_{GC_{ddm}}}{0.0875} - \arctan\left(\frac{z_{RWY} - b_z}{x_{RWY} + \frac{TCH}{\tan GPA}}\right)}{1 + \frac{0.12 \times \text{sign}(\eta_{GS_{ddm}}) \times \eta_{GS_{ddm}}}{0.0875}}.$$

12. An aircraft comprising:

a system for determining a position error of an aircraft during an approach procedure of the aircraft with a view to landing on a runway, wherein the system comprises at least the following modules implemented in an iterative manner:

a first set of collection modules implemented in each iteration, the first set of collection modules comprising:

an offset collection module configured to collect a current offset measured by an offset measurement module based on a reference guidance signal transmitted by a transmitting station of a landing assistance device, the landing assistance device comprising at least a ground-based transmitting station configured to transmit the reference guidance signal defining a reference guidance axis, the runway having a longitudinal axis and a threshold;

a position vector collection module configured to collect a current position vector of the aircraft measured by a position vector measurement module based on signals transmitted by a geopositioning system, the current position vector comprising a current longitudinal position and at least one from among a current lateral position and a current vertical position;

a second set of computation modules comprising:

a first computation module, implemented in a first iteration, configured to compute an angular alignment bias of the reference guidance axis in relation to an approach axis of the runway based on the current offset, the current longitudinal position and said at least one from among the current lateral position and the current vertical position;

a second computation module, implemented in a second iteration subsequent to the first iteration, configured to compute an observable position bias based on the angular alignment bias computed in the first iteration, the current offset, the current longitudinal position and said at least one from among the current lateral position and the current vertical position;

a third computation module, implemented in a third iteration subsequent to the second iteration, configured to compute the position error based on the observable position bias computed in the second iteration, the current longitudinal position and a longitudinal position measured in a previous iteration; a first transmission module configured to transmit the position error to a first user device, and realigning, by an automatic pilot of the aircraft, the aircraft based on the position error.

13. The aircraft according to claim 12, wherein the system further comprises at least one of the following filtering modules:

a first filtering module configured to filter the angular alignment bias computed by the first computation module; and a second filtering module configured to filter the observable position bias computed by the second computation module.

14. The aircraft system according to claim 12, wherein the system further comprises:

a fourth computation module configured to compute a corrected angular alignment bias based on the current offset, the current longitudinal position, said at least one from among the current lateral position and the current vertical position and the position error computed by the third computation module;

a second transmission module configured to transmit the corrected angular alignment bias to a second user device.

* * * * *